United States Patent [19]

Hinden

[11] Patent Number: 4,995,426

[45] Date of Patent: Feb. 26, 1991

[54] STOCK MATERIAL FOR FORMING AIR TURNING VANES AND AIR GUIDE DEVICES

[76] Inventor: Milton Hinden, Rte. #110, Farmingdale, N.Y. 11735

[21] Appl. No.: 258,493

[22] Filed: Oct. 17, 1988

[51] Int. Cl.⁵ .............................. F15D 1/04; B32B 3/24
[52] U.S. Cl. ...................................... 138/39; 428/192; 428/126; 428/167; 428/906
[58] Field of Search ............... 138/103, 128, 129, 134, 138/121, 122, 156, 170, 171, 178, 39, 37; 428/37, 43, 126, 192, 167, 571, 572, 906

[56] References Cited

U.S. PATENT DOCUMENTS

| | | |
|---|---|---|
| 24,480 | 6/1859 | Montgomery ...................... 138/173 |
| 440,512 | 11/1890 | Serve ...................... 138/171 |
| 607,620 | 7/1898 | Kemp ...................... 138/173 |
| 1,049,544 | 1/1913 | Smith ...................... 138/173 |
| 1,993,965 | 3/1935 | Huck et al. ...................... 138/128 |
| 2,409,249 | 10/1946 | Brown ...................... 138/173 |
| 2,705,973 | 4/1955 | Kile ...................... 138/39 |
| 2,959,195 | 11/1960 | Gracer ...................... 138/39 |
| 3,315,676 | 4/1967 | Cooper ...................... 428/43 |
| 3,847,185 | 11/1974 | Raevsky ...................... 138/134 |
| 4,129,152 | 12/1978 | Davis ...................... 138/173 |
| 4,186,779 | 2/1980 | Wagner ...................... 138/171 |
| 4,264,664 | 4/1981 | Kunz ...................... 428/906 |
| 4,313,991 | 2/1982 | Lamb ...................... 428/906 |
| 4,375,491 | 3/1983 | Honig ...................... 428/906 |
| 4,394,410 | 7/1983 | Osrow et al. ...................... 428/906 |

FOREIGN PATENT DOCUMENTS 415280 8/1934 United Kingdom ................. 138/39

*Primary Examiner*—James E. Bryant, III
*Attorney, Agent, or Firm*—Mark T. Basseches; Paula T. Basseches

[57] ABSTRACT

A coil of stock material from which air turning vanes are formed. The material includes a central striated bend area which facilitates the formation of increments of the material severed from the coil into desired arcuate configurations. An air guide assembly formed of the vanes of the stock material is likewise described for conducting air with high efficiency about the bends between adjacent ducts.

7 Claims, 2 Drawing Sheets

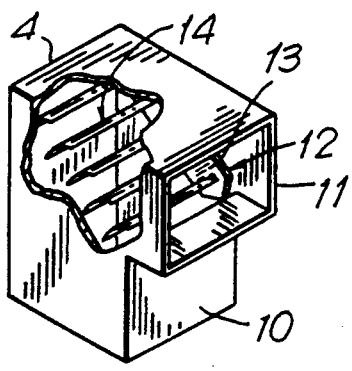
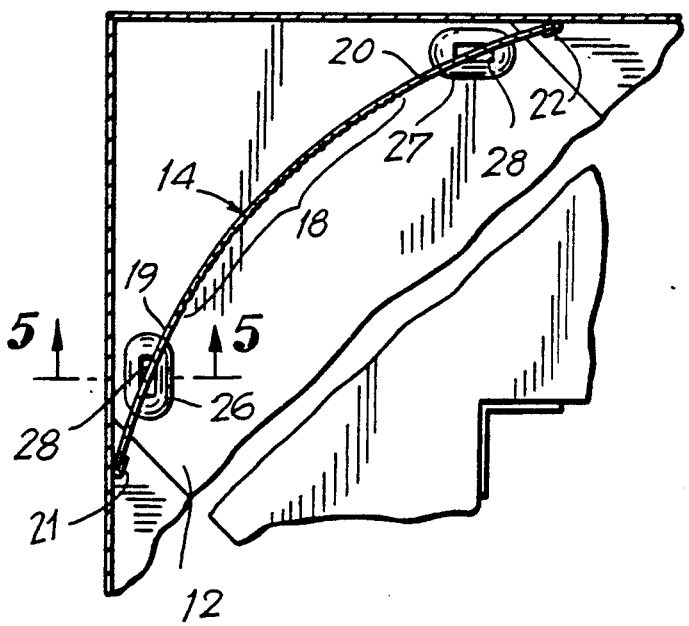
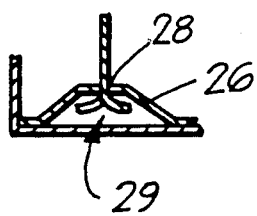
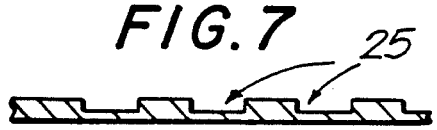

STOCK MATERIAL FOR FORMING AIR TURNING VANES AND AIR GUIDE DEVICES

BACKGROUND OF THE INVENTION

1. Field of the Invention

The present invention is directed to a stock material from which air turning vanes may be formed, and to an air guide assembly formed therefrom, such assembly being used in air conduits such as air conditioning and heating ducts.

2. The Prior Art

It is conventional in order to increase the flow efficiency of air moving in the air ducts of air heating and cooling installations to provide air guides at the bends or corners.

In accordance with U.S. Pats. No. 2861,597 of Nov. 25, 1958 and No. 2959,195 of Nov. 8, 1960, the air guides may be comprised of a spaced pair of parallel rails. The rails may include paired projections having slots converging toward the center line of the rails. Arcuate sheet metal scoops or vanes extend between the spaced rails, the transverse edges of the rails extending into the slots of the protuberances and being secured therein to define a three dimensional structure.

The structure is mounted in the corner or bend area of a duct and minimizes turbulent flow so as to increase the efficiency with which air moves in the ducting.

The vane members which extend between the rails have heretofore been supplied as precurved elongate sheet metal elements from which increments are cut in accordance with the spacing of the rails, which spacing is, in turn, dictated by the transverse dimension of the duct.

The use of stock vane materials of the type described is economically undesirable both from the standpoint of wastage of material and from the standpoint of efficiency of air conduction.

By way of example, where the vane material is supplied in eight foot lengths and a vane length of one and one half feet is required, it will be evident that portions of the eight foot length must be discarded Similarly, from the flow efficiency standpoint, it is desirable that the entry and exit edges of the vane will run parallel to the input and output axes of the duct.

While stock material thus may be prebent to conduct air about a 90° turn, leaving the entry and exit edges of the vane material parallel to the input and output duct axes, such vane material will exhibit less than optimal flow and guidance characteristics where installed at a duct bend of less than 90°.

Obviously it is impracticable to supply precurved lengths of duct material adapted to accommodate each and every angular bend within a ducting system.

U.S. Pat. No. 2972,358 of Feb. 21, 1961 discloses a vane runner fitting wherein the angular relationship between the vane and vane rail is adjustable, such that flat blades or arcuate blades of preformed configuration may be swiveled or tilted relative to the mounting rails.

While such device enables manipulation of a preformed blade somewhat to increase flow efficiency, it still fails to solve the problems inherent in the use of precurved vanes or provide optimal results where non-conventional (non 90°) bends are encountered.

SUMMARY OF THE INVENTION

The present invention may be summarized as directed to a coil of stock material from which air turning vanes may be formed and to an air guide assembly constructed therefrom.

More particularly, the invention relates to a stock material comprised of a coiled length of sheet metal characterized in that the marginal edges thereof are bent through 180° and flattened against a surface of the coil, and particularly characterized in that a central portion of the stock material is formed with longitudinally directed striations defined either by a rippling of the metal or by the formation of scoring. The striations occupy a central portion of the band comprised of at least about one half of the width of the band between the edges. Preferably there are provided areas free of striations adjacent the margins.

The material is used by severing lengths thereof from the coil and forming the same into an arcuate configuration by a bending action limited to the central striated area, the arc radius being readily accommodated to the bend configuration dictated by the duct geometry such that the leading and trailing edges of the vanes formed from the stock material are essentially aligned with the axis of the entry and exit ducting defining the bend. The formation of a curvature is facilitated by the striations.

The formed vanes may be mounted within rails to define an air guide unit, as illustrated in the above referenced U.S. patents.

It is accordingly an object of the invention to provide a stock material suitable for forming air turning vanes.

More particularly, it is an object of the invention to provide a readily bendable stock material supplied as a coil from which selected lengths may be removed, and an air guide assembly utilizing vane rails which accommodate the vanes formed from the stock material.

BRIEF DESCRIPTION OF THE DRAWINGS

FIG. 3 is a perspective view of a corner section of a duct with parts broken away to show an air guide formed utilizing the stock material;

FIG. 4 is a fragmentary magnified sectional view taken on the line 4—4 of FIG. 3;

FIG. 5 is a magnified horizontal section taken on the line 5—5 of FIG. 4;

FIGS. 6 and 7 represent fragmentary sectional views through a central striated portion of the stock material illustrating representative forms of striations.

DETAILED DESCRIPTION OF THE DRAWINGS

Figure 1:
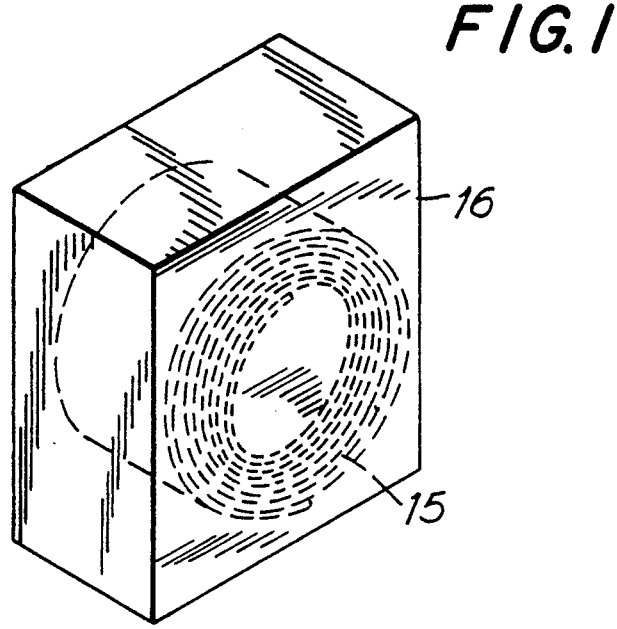
FIG. 1 is a perspective view of a packaged coil of stock material in accordance with the invention.

Shown in FIG. 3 is a representative view of two adjacent duct sections defining a bend or junction in an air conduit system, such as a heating or air conditioning installation.

By way of example, upwardly directed duct section 10 may extend from the plenum of a hot air furnace and is connected to distributor duct section 11 which is disposed, in this instance, at right angles to the section 10.

In order to maximize flow efficiency between duct sections 10 and 11, it is conventional to mount an air guide assembly 12 diagonally between the duct sections, the guide assembly being comprised of a pair of vane rails 13 (only one being shown in FIG. 3), between which rails are mounted a plurality of air guide vanes 14.

In accordance with the invention, the vanes 14 are formed from a coiled length of stock material from which increments may be removed and readily bent or curved about their longitudinal axis to form the vane members 14.

Referring now to FIG. 1, a coil 15 of the stock material, which may be supplied in lengths of fifty or more feet, is disclosed as packaged within a carton 16. By way of example and without limitation, the stock material may be formed of 24 gauge galvanized iron.

Figure 2:
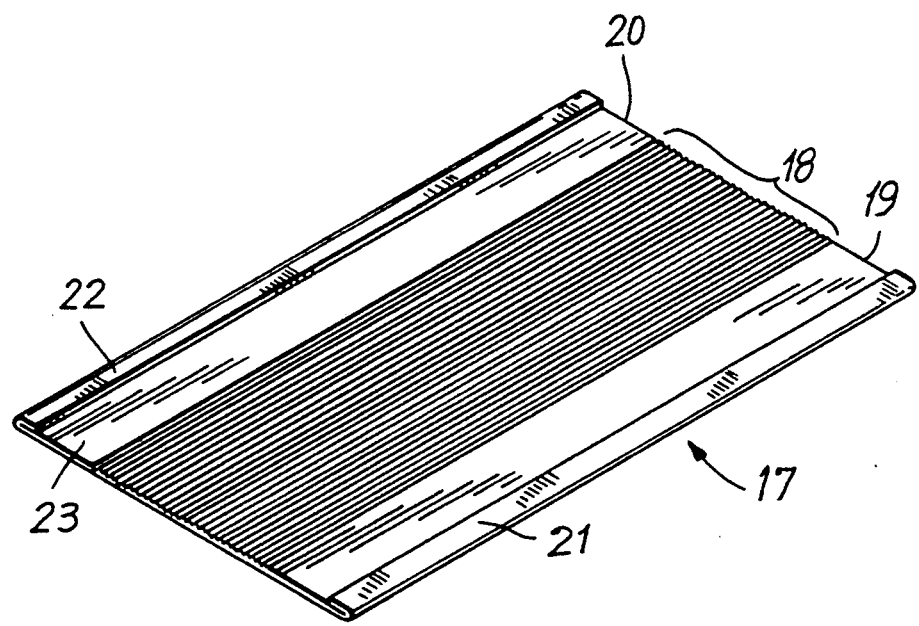
FIG. 2 is a perspective view on an enlarged scale of a section of stock material removed from the coil.

In FIG. 2 there is illustrated a length 17 of stock material severed from the coil, the length of material severed being, of course, cut to the transverse dimension of the interior of ducts 10, 11.

The stock material includes a central striated area 18 surrounded by longitudinally directed unstriated areas 19, 20, terminating in double thickness edge portions 21, 22. The edge portions 21, 22 are formed by roll forming the margins of the metal strip from which the stock material is formed through an angle of 180°, such that the edges are flattened against the surface 23 of the stock material.

By virtue of the striated area 18 which is symmetrically located and extends across at least about one half of the total width of the formed band, the severed increment is rendered readily deformable about a bending axis paralleling the longitudinal axis of the increment to an arcuate configuration such as is shown in FIG. 4.

The provision of striations enables the installer to configure the severed increments to virtually any curvature desired.

Bending is preferably effected by forming the increments over the curved surface of a mandrel or like appliance.

The striations as shown in FIGS. 6 and 7 may take the form of a sinuous or rippled bend area 24, FIG. 6, or may take the form of scorings 25 of any of a variety of shapes in either or both surfaces of the metal, whereby increments of metal are actually removed from the material of the blank.

The arcuately formed vanes 14 are mounted within an opposed parallel pair of vane rails 12 by any of a variety of attachment means, such as, by way of example, the attachment means described more particularly in the above referenced U.S. patents.

Illustratively, the rails may be formed with longitudinally spaced pairs of inwardly projecting protuberances 26, 27. The projections may include transversely directed slots 28 through which end portions of the vanes extend. The end portions may be locked to the protuberances as by severing a portion of the vanes extending through the protuberances and thereafter bending the severed increments in opposite directions, as illustrated at 29 in FIG. 5.

The above procedure securely locks the vane ends to the rails whereby there is created an air guide assembly comprised of a pair of vane rails 12 having extending therebetween a plurality of arcuately curved vanes 14.

The distal ends of the vane rails are cut to the configuration of the duct, in the illustrated embodiment the rails having outwardly projecting right angles at their upper ends and inwardly directed right angular cutouts at their lower ends.

It will be appreciated that the arcuate configuration of the vanes as supported by the rails can be readily varied in accordance with the angular orientation of the slots 28 formed in the protuberances. Adjustable protuberances rotatable relative to the rails may be employed, as shown in one or more of the cited references.

It has been empirically determined that the ripples or striated central portions of the vanes, in addition to facilitating bending of the vanes to any desired arcuate configuration, appears also to increase flow efficiency, contrary to what might be expected Without limitation to any specific theory, the observed augmented flow efficiency is attributed to the creation of a slight turbulence immediately at the blade surfaces which, it is theorized, guides the main volume of moving air in an efficient manner across the vane surfaces and around the bend of the duct junction.

Accordingly, the striations will be seen to have a double function of improved formability and improving flow efficiency.

As will be apparent to those skilled in the art and familiarized with the instant disclosure, there is described an improved stock material for the formation of air turning vanes and an air guide assembly formed therefrom. Numerous variations in details of construction may occur in the light of the disclosure and, accordingly, the invention is to be broadly construed within the scope of the appended claims.

Having thus described the invention and illustrated its use, what is claimed as new and is desired to be secured by Letters Patent is:

1. As a new article of manufacture, a coil of stock material for the fabrication of air turning vanes comprising, in combination, a coiled elongate band of sheet metal, the edge portions of said band being bent through an angle of 180° and flattened against a first surface of said band thereby to define double thickness margins of said band, said band including a central portion having longitudinally directed striations defining a weakened bend area, the transverse extend of said striated central portion being at least about one half of the transverse dimension of said band, said band including areas free of striations between said margins and said central portion.

2. The article of claim 1 wherein said striations are defined by sinuous bends in said central portion.

3. The article of claim 1 wherein said striations are defined by grooves cut into the body of said band within said central portion.

4. An air turning assembly comprised of a spaced parallel pair of vane rails and a plurality of air turning vanes extending between and affixed to said vane rails, said vanes comprising sheet metal members bent to an arcuate configuration and including a central striated bend area, the longitudinal edge portions of said vanes being of double thickness defined by portions of said vanes bent through 180° and flattened against a surface of said vanes, said vane rails comprising metal strips having pairs of inwardly directed protuberances, the protuberances of each pair including a transverse slot, the slots of each protuberance pair converging angularly inwardly and intersecting substantially at the center line of said rails, end portions of the said vanes being disposed and secured within said slots.

5. An assembly in accordance with claim 4 wherein portions of said vanes between said margins and said central area are free of said striations.

6. An air turning vane assembly in accordance with claim 5 wherein said striations are defined by sinuous bands in said central bend area.

7. An air turning assembly in accordance with claim 5 wherein said striations are defined by grooves cut into the body of said metal.

* * * * *